STEPHEN D. FOSTER.
Improvement in Handles for Brushes.

No. 125,279. Patented April 2, 1872.

Witnesses:

Inventor:
Stephen D. Foster 125,279

UNITED STATES PATENT OFFICE.

STEPHEN D. FOSTER, OF PORTLAND, MAINE.

IMPROVEMENT IN HANDLES FOR BRUSHES.

Specification forming part of Letters Patent No. 125,279, dated April 2, 1872.

*To all whom it may concern:*

Be it known that I, STEPHEN D. FOSTER, of Portland, in the county of Cumberland and State of Maine, have invented certain Improvements in Handles for Brushes, &c.; and I hereby declare that the following is a full, clear, and exact description thereof, reference being had to the accompanying drawing making part of this specification, and in which—

Figure 1:
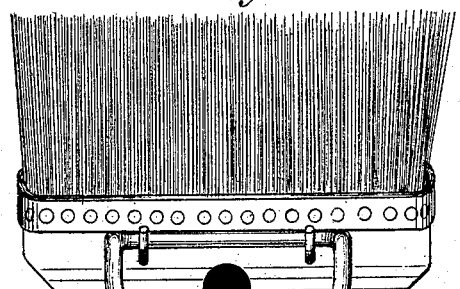
Figure 2:
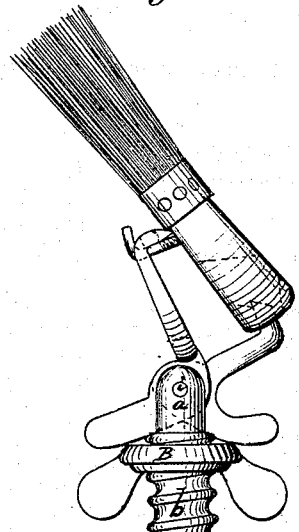
Figure 4:
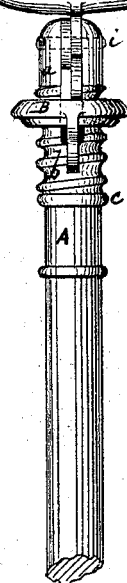
Figure 4:
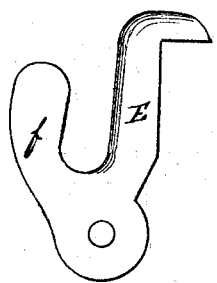
Figure 3:
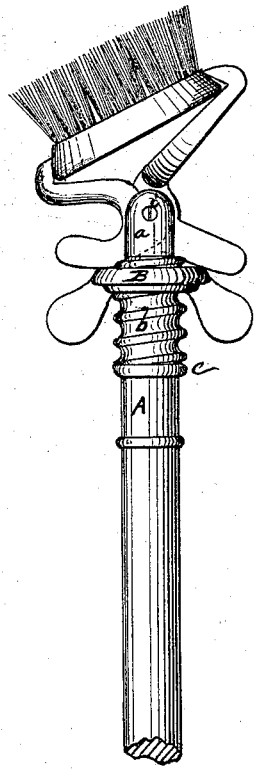
Figure 5:
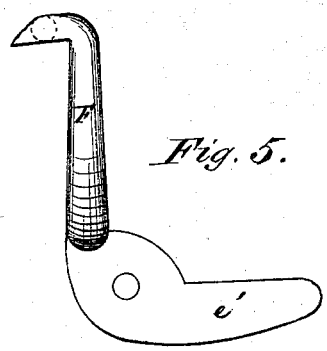

Figure 1 is a front elevation of my holder attached to a whitewashing-brush. Fig. 2 is a side elevation of the same. Fig. 3 is a side elevation, with a scrubbing-brush attached. Figs. 4 and 5 are details, to be referred to.

The object of my invention is to hold a detachable handle to brushes, &c., in a more effectual and substantial manner than heretofore; and it consists of a shank, made of metal or other suitable material, having a slot at its end for the reception of two clamps, pivoted and brought together by means of levers forced up by a nut working on a screw-thread on the metal shank, the nut being retained on the shank by means of a boss at its end.

In order that those skilled in the art may make and use my invention, I will proceed to describe the manner in which I have carried it out.

In the said drawing, A is a shank having a slotted end, *a*, and a screw-thread, *b*, in part or the whole of the distance down it. At the lower end of the screw is a rib or boss, *c*, sufficiently large to prevent the nut B on the screw-thread *b* from passing over it. In the shank A are pivoted, by the pin or screw *i*, two lever-clamps, E and F, shaped as shown in the drawing. The clamp F has, extending at right angles from its line of contact (the bar *e*) with the brush, a lever, *e'*. The end of the clamp E is turned into a bent lever, *f*, the construction being shown by the dotted lines.

The operation of my device is this: The brush being placed between the clamps E and F, the nut B is screwed up the shank, and in consequence of the peculiar shape of my clamps and their levers it requires only a few turns of the nut to force the levers *e'* and *f* upward, and thus cause the clamps E and F to close against and around the brush and secure it firmly in position.

I am aware that handles for brushes, &c., have been made with two clamps to hold the brush. I am also aware of the devices shown in the patents of P. O'Brian, No. 78,121, dated May 19, 1868, and to C. L. W. Baker, April 4, 1871; but these have various and sundry objections, which I have overcome in my invention. I disclaim any combination of devices contained in the aforesaid patents; but What I do claim as my invention, and desire to secure by Letters Patent, is—

1. A handle for brushes, consisting of two clamps, E and F, attached to the levers *e'* and *f*, constructed as described, and working in opposite directions, as and for the purpose set forth.

2. The pivoted clamps E and F with the levers *e'* and *f*, in combination with the shank A and nut B, substantially as and for the purpose described.

STEPHEN D. FOSTER.

Attest:
RICHD. K. EVANS,
WM. M. EVANS.